Feb. 10, 1942.   N. A. WIDGREN   2,272,283
BRACKET CONSTRUCTION
Filed March 18, 1939   2 Sheets-Sheet 1
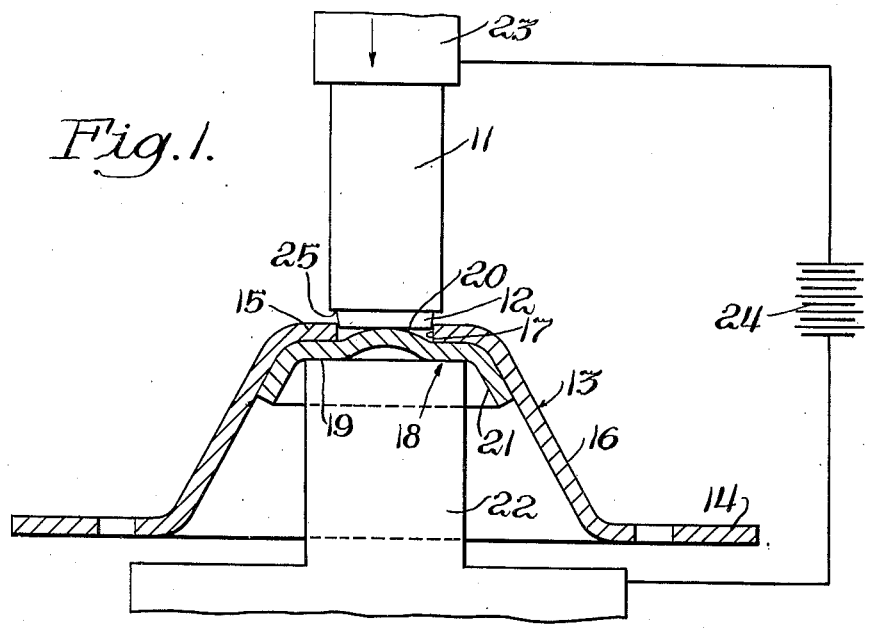
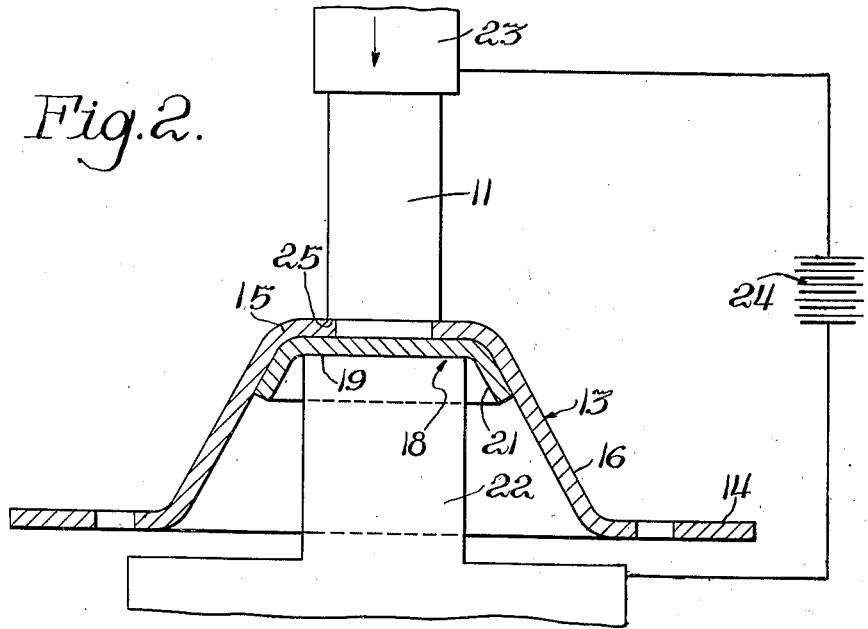
Inventor
Nels A. Widgren
By Paul O. Pippel
Att'y.

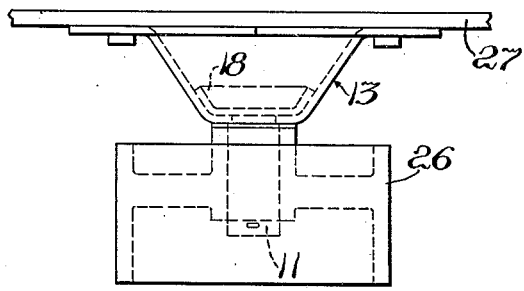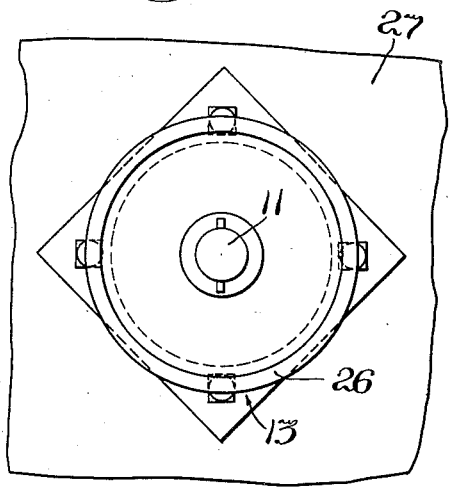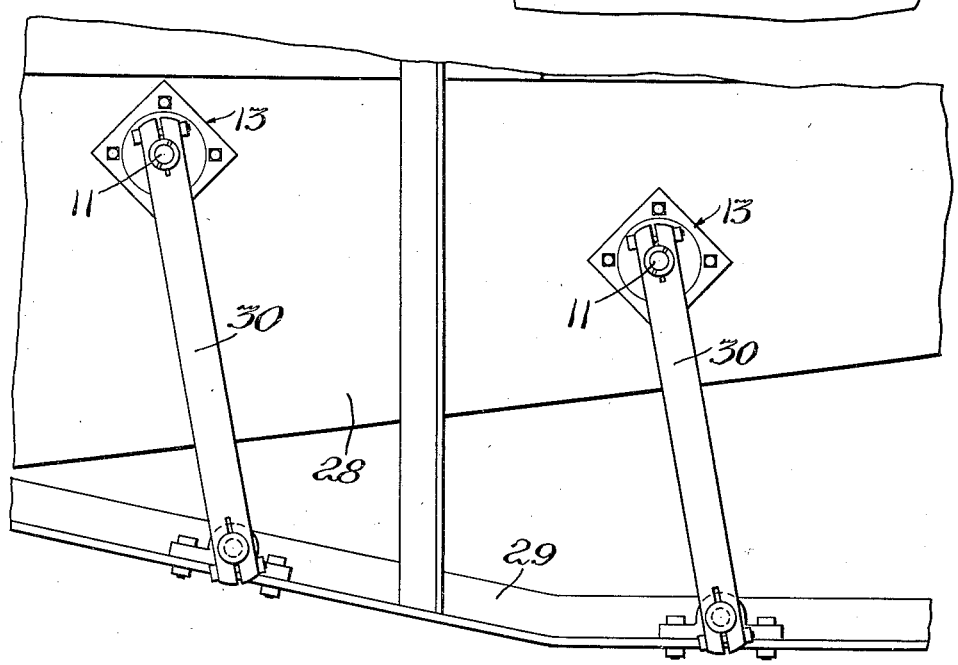

Patented Feb. 10, 1942

2,272,283

UNITED STATES PATENT OFFICE 2,272,283

BRACKET CONSTRUCTION

Nels A. Widgren, Chicago, Ill., assignor to International Harvester Company, a corporation of New Jersey Application March 18, 1939, Serial No. 262,743

1 Claim. (Cl. 248—200)

This invention relates to a bracket construction. More specifically, it relates to the joining of a pin to a bracket, which pin is subject to side thrust by a member rotatably mounted thereon.

In machinery constructions, there is often need of a bracket with a pin or shaft rigidly secured thereto, which is to support rotatably an element such as an idler pulley. Such a combination bracket and pin may also find use in a thresher in which it serves as the means by which a reciprocal part such as a grain pan is carried on a swinging rod. In either case, there is considerable side thrust upon the pin, and it is necessary that it be very securely joined to the bracket.

An object of the present invention is to provide an improved combination pin and bracket.

Another object is the provision of a novel method for making a combination pin and bracket.

A further object is to provide a combination pin and bracket composed of a plurality of parts welded together.

Still another object is to provide an improved method for welding a combination pin and bracket.

A further object is the provision of an improved method for welding a plurality of parts together.

Other objects will appear from the disclosure.

According to the present invention, a pin and a bracket are made up of separate parts. The bracket is provided with an opening against which is placed a reenforcing piece having a projection extending into the opening. The end of the pin is inserted in the opening against the projection and is welded electrically to the projection and to the sides of the opening.

In the drawings—

Figure 1 shows the individual parts of the novel combination pin and bracket in position for welding;

Figure 2 shows the same parts after welding;

Figures 3 and 4 illustrate the use of the novel pin and bracket for supporting a pulley; and Figure 5 shows the use of the novel pin and bracket for carrying the grain pan of a thresher.

A pin has a reduced frusto-conical end 12. A bracket 13 has a base or attaching portion 14, a central portion 15 disposed out of the plane of the base portion, and a frusto-conical portion 16 joining the base and central portions. The bracket 13 is of generally square shape as shown in Figure 4 and may be formed by drawing a flat piece of sheet metal. A hole 17 is provided in the central portion 15 of a diameter somewhat smaller than the largest diameter of the frusto-conical end 12 of the pin and somewhat larger than the smallest diameter thereof so that it may be said to be equal to the average diameter of the end. There is also provided a reenforcing member 18 having a central portion 19 and a frusto-conical peripheral flange 21. A projection 20 is pressed from the central portion 19.

The parts are assembled and rest on an electrode 22, as shown in Figure 1 so that the reenforcing member 18 is within the bracket 13 with the central portions and frusto-conical portions, respectively, in contact with the projection 20 in the recess 17 and the frusto-conical end 12 of the pin contacts the projection 20 in the recess 17. An electrode 23 is caused to rest on the pin 11. The electrodes are connected to a source of electric current represented by 24. Current is passed between the electrodes through the reenforcing member 18 and the pin 11, and simultaneously therewith the electrodes are moved toward one another so as to move the end 12 of the pin 11 farther into the recess 17 against the projection 20. A weld is formed between the end surface of the frusto-conical end 12 and the projection 20 because of the small area of contact. As the end 12 moves into the opening 17, the frusto-conical surface of the end has line contact with the sides of the opening. Consequently, there is an intense heating, and the edges of the opening burn away. However, the diameter of the frusto-conical end 12 in contact with the edges of the opening 17 becomes increasingly greater as the end 12 moves into the opening 17. Accordingly, the frusto-conical surface and the side of the opening stay in contact in spite of the burning away, and a weld is effected.

The upper surface of the electrode 22 limits the movement of the end 12 into the opening. As shown in Figure 2, the projection 20 is pressed out flat against the electrode 22. The thickness of the reduced frusto-conical end 12 is equal to the thickness of the central portion 15 of the bracket 13 so that in the final position of Figure 2, a shoulder 25 formed at the juncture of the reduced frusto-conical end 12 and the larger diameter portion of the pin 11 is in contact or nearly in contact with the central portion 15 of the bracket. The finished product of Figure 2 comprises a pin, a bracket, and a reenforcing piece, the side surface of the end of the pin being welded to the side of an opening in the bracket and the end surface of the pin being welded to the reenforcing piece. There are actually two distinct welds, and the pin is joined very securely to the bracket. The reenforcing piece 18 is of advantage not only because it is a convenient way of providing a welding projection in the opening 17 but also because it provides an extra thickness of metal in contact with the central portion 15 and frusto-conical portion 16 of the bracket 13, which strengthens and stiffens the bracket.

Figures 3 and 4 illustrate the use of the invention for supporting an idler pulley 26 on a part 27. The pulley 26 is rotatably mounted on the pin 11, and the bracket 13 is attached to the part 27. It is evident that the pin is subject to considerable lateral thrust from the pulley, and a strong connection between the pin and bracket is essential.

Figure 5 illustrates the use of the invention in connection with a thresher of which there is shown a grain pan 28 and framework 29. The grain pan is carried on the framework by means of a pair of rods 30 which allow the pair the necessary reciprocal movement. Attachment of each rod 30 to the grain pan is by means of the pin 11 and bracket 13, the end of the rod being rotatably mounted on the pin. It is obvious that the pins must stand considerable side pressure for the weight of the grain pin is carried on these pins and similar pins secured to brackets on the opposite side of the pan.

The combination pin and bracket of the present invention will obviously have other uses than that illustrated. While the invention is of special advantage in cases where there is side thrust on the pin, its use is, of course, not limited to such cases.

The intention is to limit the invention only in the terms of the appended claim:

What is claimed is:

A bracket having a base portion, a central portion disposed out of the plane of the base portion and provided with an opening, and a frusto-conical portion joining the base and central portions, a reenforcing member having a central portion and a frusto-conical flange, respectively, in contact with the central portion and the inner side of the frusto-conical portion of the bracket, and a pin having an end fitting within the opening in the bracket and being welded to the bracket and to the reenforcing member.

NELS A. WIDGREN.